March 12, 1963 E. P. G. WRIGHT ETAL 3,081,448

INTELLIGENCE STORAGE EQUIPMENT

Filed July 5, 1957

Inventors
E.P.G. WRIGHT
D.S. RIDLER
W. BEZDEL
By Robert Harding Jr.
Attorney 3,081,448

INTELLIGENCE STORAGE EQUIPMENT

Esmond Philip Goodwin Wright, Desmond Sydney Ridler, and Wincenty Bezdel, London, England, assignors to International Standard Electric Corporation, New York, N.Y.

Filed July 5, 1957, Ser. No. 670,224
Claims priority, application Great Britain July 13, 1956
4 Claims. (Cl. 340—174)

Figure 1:
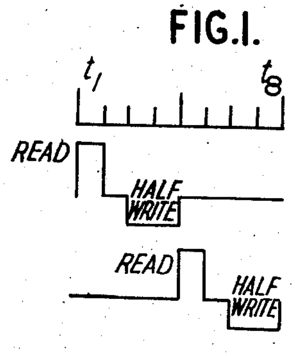

This invention relates to intelligence storage equipment using arrays of binary intelligence storage or memory cells, particularly coordinate arrays of bistable cells, and especially to such arrays using saturable ferro-type cells.

Each bistable cell has a reset state which may be considered as representing binary 0 and an alternative state representing binary 1.

The invention provides a novel arrangement for transferring intelligence, represented by the state of a cell, from one cell to another in a cell array.

The invention further provides such novel arrangement in connection with a coordinate array of storage cells in order to transfer intelligence serially from one row to another. One feature of the arrangement is the use of a binary cell common to two or more rows.

The invention particularly provides a novel intelligence advancing and transferring arrangement in connection with intelligence storage equipment involving a coordinate array of ferro-type binary cells, capacitative or ferromagnetic or the like, wherein row wires or leads are operationally associated with the respective rows of cells and column wires are operationally associated with cell-columns. Such arrays have been disclosed (Patent No. 2,717,373 and application Ser. No. 492,982, filed March 8, 1955 now Patent No. 2,952,840) wherein a read pulse addressed to a row wire resets any cell in the row to 0 state and causes it to produce an output or intelligence read-out pulse or signal on its column wire and wherein, further, write-in pulses, specifically half-write pulses, concurrently acting on the row and column wires of a cell combine to set the cell from 0 state to 1 state.

The invention provides for such equipment a novel arrangement involving a storage cell common to a plurality of cell-rows and transfer circuitry utilizing the common cell in effecting transfer of intelligence from one row to a next or, in effect, for transferring the 1 state of a cell in one row to another cell in a next row.

The common cell will be on its own column wire but will be served by the row wires of at least two rows of the cells. These row wires will be pulsed sequentially. This may be done in cyclic sequence such that during one subcycle, operating pulses in a read-write wave form will be addressed to a first row wire and in a next subcycle a similar read-write pulse form will be put on the second row wire. In response to the read pulse on a first row wire, a cell, the penultimate one, in the first row will be reset and a read-out pulse will appear on its column wire. This read-out pulse will control the transfer means to apply a half-write pulse to the common cell during the cyclic time in which a similar pulse within a read-write wave form is present on the first row wire. Hence the common cell will be set to its 1 state. Following this, a read pulse on the second row wire will reset the common cell and cause it to produce a read-out pulse on its column wire. In response to the latter pulse, the transfer means will apply a half-write pulse to the column wire of a cell, the first, in the second row during the cyclic period in which a similar pulse within a read-write wave form is acting on the second row wire. Thus the latter cell will be set to its 1 state, completing the transfer of an element of intelligence from a cell in the first of the rows to another cell in a second of the rows.

The terms rows and columns are understood to be used here in a relative sense and no absolute directional meaning is intended.

Other features of the invention will appear in the following portions of the specification and from the drawing wherein:

FIG. 1 shows a cycle of two successive typical read-write wave forms.

Figures 2, 2A:
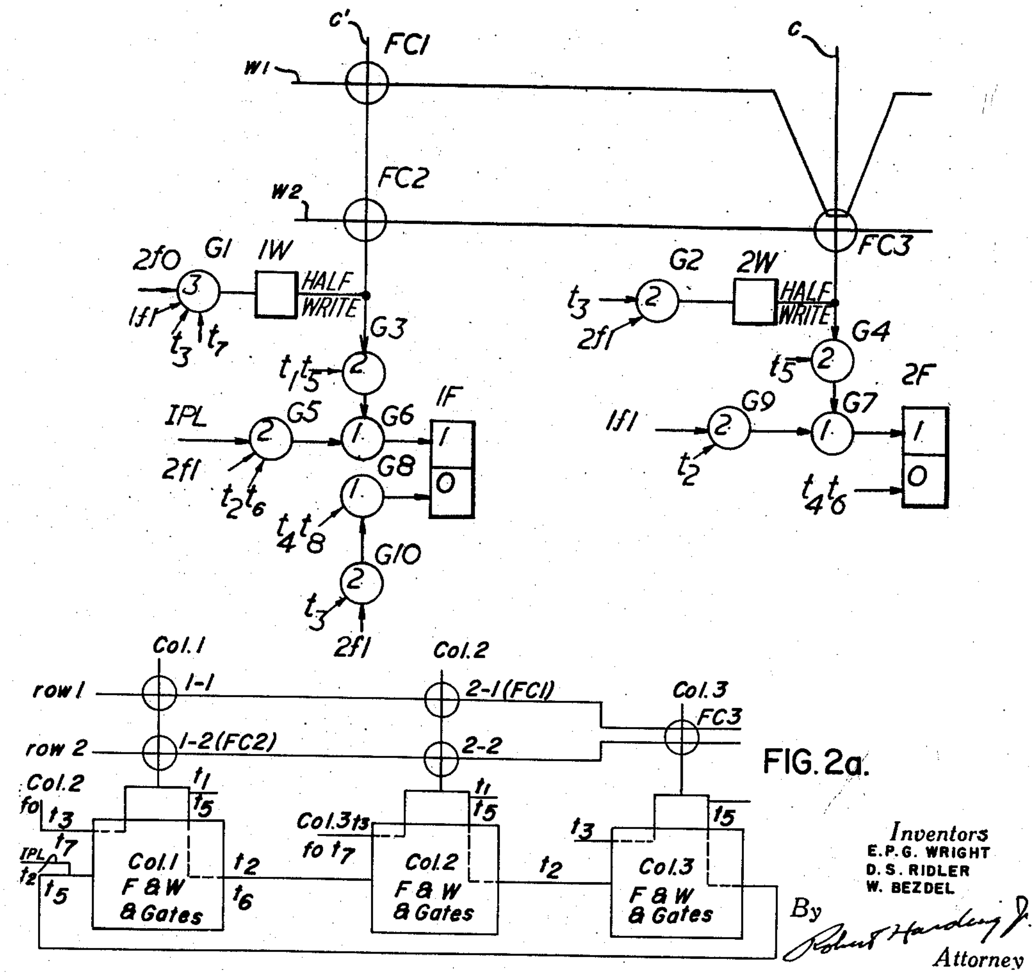

FIG. 2 diagrammatically shows the basic circuitry of the invention.

FIG. 2*a* is a diagrammatic showing of a typical expansion of the basic circuit arrangement.

In the specific form used and shown, the ferro-type storage cells are ferromagnetic cells such as toroids. These are threaded by row and column wires, each wire provided with operational windings one for each cell threaded by the wire. In FIG. 2, FC1 is a cell in a first row (upper row as shown), FC2 is a cell in the second row and FC3 is a common cell for both rows. First and second row wires *w*1 and *w*2 respectively thread FC1 and FC2 and both row wires thread common cell FC3. A column wire *c* threads FC3, while FC1 and FC2 are shown as threaded by a common column wire *c'*. As will be shown later, FC1 and FC2 may be on separate column wires. Through suitable access means, read-write wave forms will be addressed to first and second row wires *w*1 and *w*2 in sequence. Two such wave forms per sequence cycle are needed for the two-row array shown. For three rows between which transfer is to take place, a cycle with three successive wave forms will be used, and so on for more rows.

As shown in FIG. 1, first and second identical wave forms occur in successive halves or subcycles of each of recurrent cycles. These wave forms and gating or timing pulses will be obtained in known manner from suitable source means for recurrent cycles of pulses. The cycle is divided into eight equal time intervals *t*1 to *t*8 and each such interval may be referred to by its designation; e.g. time interval *t*3 may be referred to simply as *t*3. The first wave form appears in subcycle *t*1–*t*4 and has a read pulse in *t*1, a blank in *t*2 and a half-write pulse in *t*3 and *t*4. The second wave form occurs in subcycle *t*5–*t*8 and its read pulse is in *t*5, blank in *t*6 and half-write pulse in *t*7 and *t*8. The read pulse is of polarity and amplitude to reset, change from 1 state to 0 state, any one or more of the cells to whose row wire it is applied. Only a cell in 1 state will, in changing over from this state to its 0 state in response to a read pulse, produce a useful read-out pulse on its column wire. The half-write pulse is opposite in polarity to the read pulse and has half the amplitude required to change a cell from its 0 state to its 1 state.

Elements of the circuit system will be timed by the gating pulses one of which occurs within each of the time intervals *t*1 to *t*8. Leads receiving these gating pulses are shown marked in FIG. 2 with the cyclic times at which the pulses are applied. The number of coincident inputs which an electronic gate needs in order to open and deliver its output is indicated inside the circle representing the gate. The elements timed by gating pulses include a pair of bistable triggers 1F and 2F and a pair of half-write pulse generators 1W and 2W. In known manner, each such trigger and generator initiated in action under control of a gating pulse will produce the required output only at the trailing end of the initiating pulse, after the pulse has ceased to be effective. The working output of 1F in its 1 condition is designated 1*f*1 and the working outputs of 2F in conditions 0 and 1, respectively, are designated 2*f*0 and 2*f*1.

Assuming the store is empty, no cell in state 1, when the first wave form in a cycle is addressed to upper row wire $w1$, the read pulse at $t1$ will have no useful effect. If an element of intelligence is to be written into the store, an input signal will be on a line IPL when a gating pulse acts at $t2$ on a gate G5. G5 will open and via G6 trip 1F toward condition 1. Thus an element of intelligence to be written into the store is received via IPL and placed in temporary storage in trigger 1F. In $t3$, a gating pulse acts on a gate G1 and with its inputs $1f1$ and $2f0$ now energized this gate opens and initiates action of 1W to generate a half-write pulse for the left hand column wire. This half-write pulse combines with the similar pulse in the first wave form being addressed to the upper row wire to set cell FC1 to its 1 state. A gating pulse at $t4$ acts via a gate G8 to initiate reset of 1F to 0 status. Nothing changes in the second subcycle of the cycle under discussion.

In $t1$ of the next cycle, the read pulse on the upper row wire will reset FC1 and thus cause a read out pulse on the left hand column wire to appear and open gate G3 followed by opening of G6 so that 1F is operated toward its condition 1. In $t2$, G9 is opened followed by opening of G7 so that 2F is operated toward condition 1. In consequence in $t3$ gate G10 is opened, folowed by opening of G8 and 1F is returned toward condition 0. In $t3$ also, gate G2 is opened whereby 2W will operate to energize column wire $c$ with a half-write pulse which in conjunction with the concurring half-write pulse on the upper row wire will set FC3 to its state 1. In $t4$, 2F will be returned toward condition 0. As toroid FC3 is common to both rows of the store the read pulse in $t5$ on the lower row wire will reset FC3 and thus cause a read out pulse to appear on column wire $c$ and to open G4 followed by opening of G7 so that 2F will again operate to condition 1. In $t6$, gate G5 will be opened due to the operation of 2F so that G6 will open in turn to operate 1F toward condition 1. In $t6$, 2F will start return to condition 0 and in $t7$ with 2F in condition 0 and 1F in condition 1, gate G1 will open to cause 1W to send to column wire $c'$ a half-write pulse which in conjunction with the half-write pulse on the lower row wire will cause FC2 to register condition 1. In $t8$, 1F will be returned toward condition 0.

It will be seen that the information which was inserted in FC1 in the $t1$–$t4$ subcycles alloted to the upper storage row has now been transferred to FC2 in the $t5$–$t8$ subcycle for the lower storage row.

The invention has been described in its simplest form but it will be understood that it is within normal engineering skill to apply the principles of the invention for instance to stores and control circuits requiring transfer through several columns or to control circuits in which the individual triggers 1F, 2F are replaced by groups of triggers forming decimal or binary stores with associated groups of columns, or to cases in which more than two rows of toroids are provided so that more than two row wires are associated with the same toroid for transfer purposes.

Instead of ferromagnetic toroids, ferroelectric capacitors could form the storage devices, in which case the FC3 devices would have sufficient row wires connected in parallel to one of its plates, the other plate being connected to the individual column wire.

The basic arrangement shown in FIG. 2 for carrying out the invention can be applied to various purposes and expanded in various ways. It should be noted that the basic arrangement involves similar transfer circuits associated with the respective columns of the array. Each transfer circuit includes a temporary store F for an intelligence element and a half-write pulse generator W, along with associated gates. The store F can receive intelligence from a preceding transfer circuit and pass it by means of the generator W to a selected cell in the associated column, the selection of the cell being effected according to which row wire is being addressed with a cyclic half-write pulse. Also, the store F can receive intelligence from any cell in the associated column and transfer it to the store F of the next transfer circuit. The first column store F also can receive an intelligence element from outside the array via an input line IPL. The last column transfer circuit, the one associated with the common cell FC3, transfers intelligence from the common cell to the first column transfer circuit. Each transfer circuit can be represented in block form as in FIG. 2$a$ which also indicates the cyclic times at which gating pulses are applied to the transfer circuit.

FIG. 2$a$ diagrams the expansion of the basic arrangement to three columns. Briefly, an element of intelligence is entered via IPL at $t2$ time of a first $t1$–$t4$ subcycle into Col. 1 transfer circuit which is then activated at $t3$ time for writing the intelligence into column 1-row 1 cell 1–1 selected by the half-write pulse at $t3$–$t4$ on row 1 wire. At $t1$ of a next subcycle $t1$–$t4$, the read pulse on row 1 wire returns the intelligence from cell 1–1 to Col. 1 transfer circuit. At $t2$, Col. 1 circuit steps the intelligence to Col. 2 transfer circuit. Col. 2 transfer circuit functions in the safe way as the preceding transfer circuit to transmit the intelligence to cell 2–1 in the first row and receive it back from this cell at $t1$ of the following $t1$–$t4$ subcycle. Cell 2–1 here is the last row 1 cell preceding the common cell FC3 and corresponds to FC1 in the FIG. 2 circuit arrangement. At $t2$ time, the intelligence received by Col. 2 transfer circuit from cell 2–1 is stepped to Col. 3 transfer circuit. The latter circuit is activated at $t3$ to write the intelligence into FC3 and at $t5$ of the same cycle the intelligence is return by FC3 to this circuit. At $t6$, Col. 3 transfer circuit steps the intelligence to Col. 1 transfer circuit. At $t7$, the latter circuit starts generating a half-write pulse for column 1 wire and since row 2 wire is addressed at $t7$–$t8$ with a half-write pulse, the intelligence is written thistime into the first cell 1–2 in the second row. Cell 1–2 here corresponds to FC2 in the basic FIG. 2 array. Transfer from cell 1–2 to cell 2–2 will take place in a next $t5$–$t8$ subcycle in a manner now understood. If it is desired to recirculate the intelligence, the last column transfer circuit will also have gating pulses applied to it at $t1$, $t6$, $t7$.

The equipment can be used as a timer, commutator, intelligence register, and for other allied purposes.

While the principles of the invention have been described above in connection with specific embodiments, and particular modifications thereof, it is to be clearly understood that this description is made only by way of example and not as a limitation on the scope of the invention.

What we claim is:

1. Intelligence storage equipment comprising first and second rows of binary intelligence storage cells including a common end cell for the two rows, said cells having relatively square hysteresis curves, first and second independently excitable row wires operationally coupled with respective first and second row cells, both row wires being operationally coupled with the common end cell, and a transfer network coupled to the cells of both rows including means operable upon the pulsing of the first row wire to advance an element of intelligence from a selected cell in the first row to the common end cell and means operable upon the subsequent pulsing of the second row wire to transfer the element of intelligence from the common end cell to a selected cell in the second row.

2. An intelligence register comprising first and second rows of bistable ferro-type binary intelligence storage cells including a common end cell for the two rows, first and second independently excitable row wires operationally coupled singly with respective first and second row cells and dually with the common end cell for respectively impressing operating pulse forms on the respective first and second rows cells during sequential subcyclic periods and on the common end cell during both subcyclic periods, a first column wire operationally coupled to corresponding cells of said rows, a second column wire operationally coupled to said common end cell, and an intelligence transfer network coupled to the cells of both rows by means of said column wires and including means effective upon the pulsing of the first row cells including the common end cell during one said subcyclic period for transferring an element of intelligence by means of said column wires from a selected cell in the first row to the common end cell and also including means operating upon the pulsing of the second row cells including the common end cell during a next subcyclic period for transferring the element of intelligence by means of said column wires from the common end cell to a selected cell in the second row.

3. Intelligence storage equipment comprising a two-dimensional array of bistable ferro-type storage cells and row and column wires interlacing the cells, the array including a last column cell common to at least two relatively first and second rows of the cells, the respective row wires of the two cell rows being operationally coupled singly to their individual cells and dually to their common cell and serving as inputs for successive read and write-in pulses to the first row of cells including the common cell during a first of two sequential subcyclic periods and to the second row of cells including also the common cell during the second of the subcyclic periods, the read pulse on a cell being effective to change the cell from an operated stable state storing one element of binary intelligence to a reset state and in changing to produce an intelligence output pulse on its column wire, the write-in pulse on a row of cells enabling each to be set to operated state in response to a concurring write-in pulse on its column wire, means for transferring said element of intelligence by means of said column wires from a cell in the first row to the common cell during the first subcyclic period and including temporary storage means conditioned under control of a said output pulse on the column wire of said first row cell for temporarily storing said element of intelligence and a pulse generator activated under control of the conditioned temporary storage means to apply a write-in pulse to the last column wire during the occurrence of the first subcyclic write-in pulse on the first row of cells so as to set the common cell to its operated state, and similar means for transferring the element of intelligence by means of said column wires from the common cell to a cell in the second row during the second subcyclic period.

4. Intelligence storage equipment, a row of bistable ferro-type cells for storing binary intelligence, a row wire operationally coupled with the cells and via which successively timed read and write-enabling pulses are impressed on the cells for respectively reading out intelligence from the cells and for enabling intelligence to be written into the cells, column wires individually coupled with the cells to derive intelligence read-out pulses from the cells in response to read-pulsing of said row wires, said column wires also serving to apply write-in pulses to the cells, means for causing the write-in pulse on a column wire to be effective during write-enabling pulsing of the cells to write intelligence into the cell along the column wire, in combination with transfer circuits respectively associated with the column wires, each transfer circuit having a write-in pulse generator coupled to the associated column wire and also having a temporary storage device means for conditioning said temporary storage device under control of the preceding column transfer circuit for temporarily storing intelligence read out of the cell in the preceding column means responsive to said temporary storage device being so conditioned for activating the write-in pulse generator to impress a write-in pulse on the column wire coupled thereto during the write-enabling pulsing of the row wire so as to write intelligence into the cell coupled to the latter column wire, the temporary storage device in each transfer circuit also being coupled to the associated column wire for operation in response to a read-out pulse on this column wire and means responsive to such operation to control the conditioning of the temporary storage device in the next column transfer circuit.

References Cited in the file of this patent

UNITED STATES PATENTS

| | | |
|---|---|---|
| 2,708,722 | An Wang | May 17, 1955 |
| 2,742,632 | Whitely | Apr. 17, 1956 |
| 2,805,409 | Mader | Sept. 3, 1957 |
| 2,846,669 | McMillan et al. | Aug. 5, 1958 |
| 2,876,442 | Disson | Mar. 3, 1959 |